United States Patent [19]

Sons et al.

[11] 3,912,976

[45] Oct. 14, 1975

[54] MULTILEVEL CURRENT SENSING DETECTOR SYSTEM FOR OVERCURRENT PROTECTION OF MULTISPEED AC MOTORS

[75] Inventors: James E. Sons, Sanger; Wayne C. Starnes, Dallas, both of Tex.

[73] Assignee: Detprotector, Inc., Dallas, Tex.

[22] Filed: Nov. 5, 1973

[21] Appl. No.: 412,809

[52] U.S. Cl. ................................ 317/13 R; 317/46
[51] Int. Cl.² .......................................... H02H 3/08
[58] Field of Search .... 317/13 R, 13 A, 13 B, 13 C, 317/19, 46

[56] References Cited
UNITED STATES PATENTS

| | | | |
|---|---|---|---|
| 3,368,129 | 2/1968 | Chausse et al. | 317/13 R |
| 3,379,939 | 4/1968 | Obenhaus | 317/13 R |
| 3,742,302 | 6/1973 | Neill | 317/13 R |

FOREIGN PATENTS OR APPLICATIONS

| | | | |
|---|---|---|---|
| 764,758 | 1/1957 | United Kingdom | 317/13 C |

Primary Examiner—James D. Trammell
Attorney, Agent, or Firm—Richards, Harris & Medlock

[57] ABSTRACT

The specification discloses a system for preventing current overload in a three phase dual speed motor in both low and high speed modes. The system includes current transformers for sensing the current level in each of the three phases applied to the motor. A divider network is connected to each of the current transformers. Each of the divider networks has a first configuration for converting the sensed current in the low speed mode into a proportional voltage and further includes a second configuration for converting the sensed current in the high speed mode into a proportional voltage. Circuitry is responsive to the proportional voltages generated from the divider network in both first and second configurations in order to generate an overload signal when the voltages from the divider networks exceed a predetermined magnitude. The overload signal operates a relay in order to terminate current flow through the three phases in order to protect the motor.

20 Claims, 1 Drawing Figure

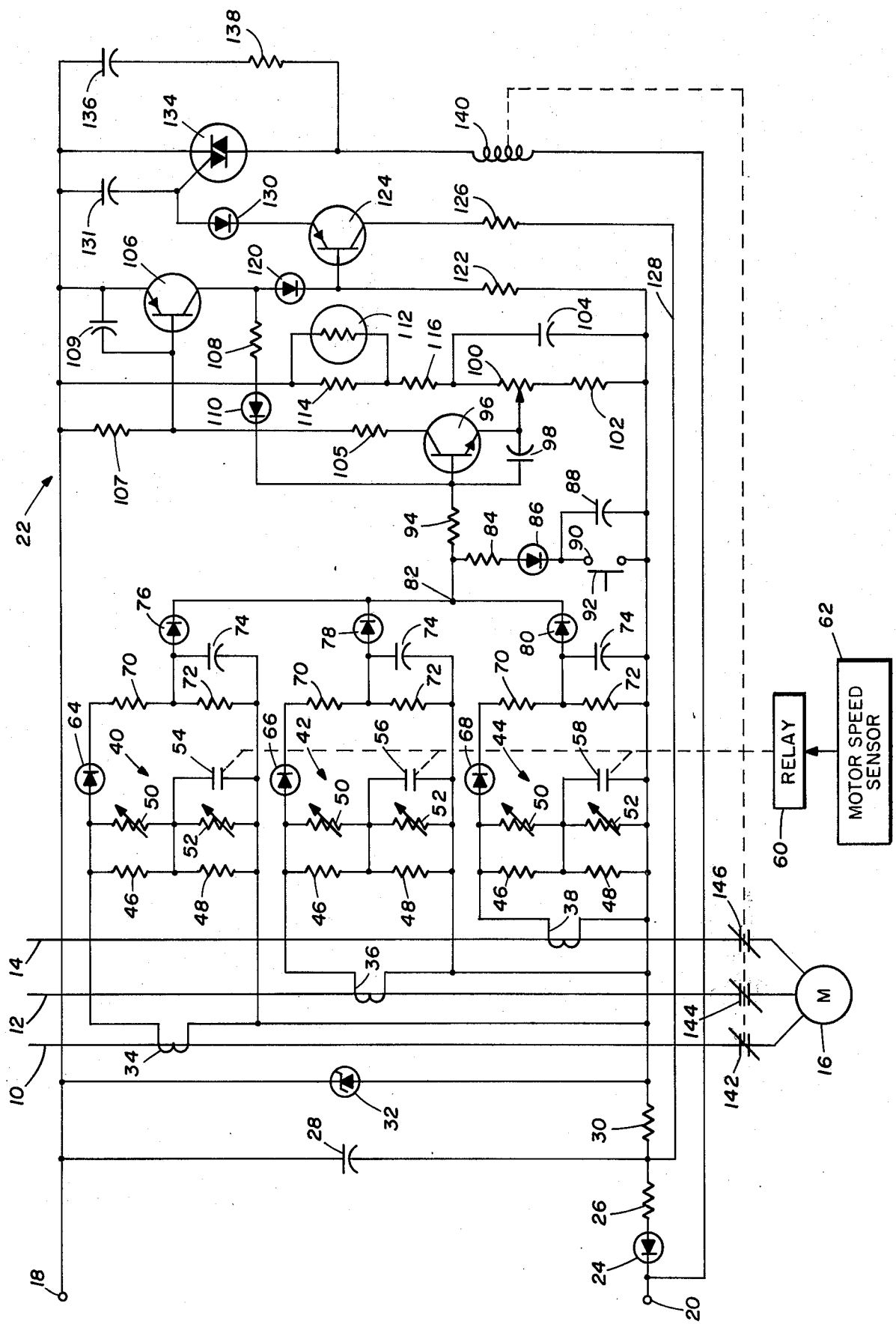

MULTILEVEL CURRENT SENSING DETECTOR SYSTEM FOR OVERCURRENT PROTECTION OF MULTISPEED AC MOTORS

FIELD OF THE INVENTION

This invention relates to motor protection systems and more particularly relates to a system for providing overcurrent protection to a multispeed A.C. motor when the motor is operating at any one of the multiple speeds.

THE PRIOR ART

A variety of different types of systems have been heretofore developed in order to prevent damage to electrical motors due to excessive current. Specifically, electrical circuits have been previously developed for sensing the current level applied to a three phase A.C. electrical motor and for terminating the supply of current to the motor when the sensed current rises above a predetermined level. However, more sophisticated multispeed motors are currently becoming widely used, and a need has thus arisen for a system for providing current overload protection to a multispeed motor in each different speed mode.

SUMMARY OF THE INVENTION

In accordance with the present invention, a system is provided for protecting an alternating current phase line from current above a plurality of predetermined levels during various operating modes. Circuitry is provided to sense the current level on the phase line and a detection system detects the occurrence of a current level above each of the plurality of levels. overload protection circuitry is responsive to the detection system for terminating current flow through the phase line upon detection of current level above any one of the plurality of predetermined levels.

In accordance with another aspect of the invention, a system is provided for protecting a multispeed motor in both low and high speed modes. Current transformers are provided for sensing the current on an input phase of the motor. Divider circuitry is operable during the low speed mode for converting the sensed current to a first voltage proportional to the sensed current. Circuitry is operable during the high speed mode for varying the divider circuitry in order to convert the sensed current to a second proportional voltage. Circuitry is responsive to either of the first and second voltages for generating an overload signal upon the occurrence of a voltage above a single predetermined magnitude. Overload protection circuitry is responsive to the overload signal for terminating current flow to the input phase of the motor.

in accordance with a more specific aspect of the invention, a system is provided for preventing current overload in a three phase multispeed motor in both low and high speed modes. A current transformer senses the current level in each of the phases. A divider network is connected to each of the current transformers and includes a first configuration for converting the sensed current in the low speed mode into a first voltage and further having a second configuration for converting the sensed current in the high speed mode into a second voltage. Circuitry is responsive to either of the voltages for generating an overload signal when the voltages exceed a predetermined magnitude. An overload protection circuitry is responsive to the overload signal for controlling the current flow through the phases of the motor.

DESCRIPTION OF THE DRAWINGS

For a more complete understanding of the present invention and for further objects and advantages thereof, reference is now made to the following description taken in conjunction with the accompanying drawing, in which the FIGURE illustrates a schematic diagram of the preferred embodiment of the invention.

DESCRIPTION OF THE PREFERRED EMBODIMENT

Referring to the FIGURE, a three phase A.C. line includes phase lines 10, 12 and 14 which are connected to supply alternating current three phase voltage to a multispeed A.C. motor 16. While it will be understood that the motor 16 could have any number of operating speeds, in the preferred embodiment the system will be described for use with a motor 16 having a low and a high speed mode of operation. A source of 24 volts AC is applied across terminals 18 and 20 from a suitable source in order to provide bias to the overload protection circuit of the invention which is generally identified by the numeral 22. A diode rectifier 24 is connected at the cathode to terminal 20, is connected at the anode to a terminal of a resistor 26. A capacitor 28 is connected across terminal 18 and the second terminal of resistor 26. A resistor 30 is also connected at one terminal of the capacitor 28. A zener diode 32 is connected across terminal 18 and a terminal of resistor 30.

A current transformer 34 is disposed adjacent phase line 10, while current transformer 36 is disposed adjacent lead 12 and a current transformer 38 is disposed adjacent lead 14. Voltage divider circuits 40, 42 and 44 are connected to the transformers 34, 36 and 38 respectively. Each of the voltage dividers 40-44 are identical and each includes a resistor network comprising fixed resistors 46 and 48 and variable resistors 50 and 52. Normally open relay contacts 54, 56 and 58 are connected across the resistors 52. Relay contacts 54-58 are operable by a relay 60 which is controlled by a motor speed sensor 62.

The motor speed sensor 62 operates the relay 60 upon the occurrence of the high speed mode of the motor 16. Sensor 62 may comprise any one of a number of different types of sensors. For example, when the motor 16 is utilized in air conditioning systems, sensor 62 may comprise a thermostat responsive to the temperature of the room in order to change the speed of the motor 16 between low to high modes and to simultaneously operate the relay 60 in order to close the relay contacts 54-58. Alternatively, the sensor 62 may comprise a mechanical device which is switched when the motor 16 is switched between low to high speed operation.

Diodes 64, 66 and 68 are connected at the anodes to the juncture of resistors 46 and 50, with the cathodes of the diodes being connected through resistors 70 to an RC network comprising resistors 72 and capacitors 74. A juncture of resistors 72 and 74 are tied to diode 76, 78 and 80, the anodes of which are commonly tied to a summing point 82. A resistor 84 is connected to summing point 82 and is connected in series with a diode 86. The cathode of diode 86 is connected through a capacitor 88 to circuit ground and is also connected to a terminal 90 of a reset switch 92. Closure of reset switch 92 shorts the cathode of diode 86 to circuit ground.

The summing point 82 is connected through a resistor 94 to the base of a transistor 96. A capacitor 98 is tied across the base and emitter of transistor 96. The emitter of transistor 96 is applied through a variable resistance 100 which is connected in series with a resistance 102 and in parallel with a capacitance 104. The collector of transistor 96 is applied through a resistor 105 to the base of a transistor 106. Bias is applied to the base of transistor 106 through a resistor 107. A capacitor 109 is connected across the base and emitter of transistor 106. A resistor 108 is connected in series with a diode 110 between the collector of transistor 106 and the base of transistor 96. A temperature sensitive thyristor 112 is connected across a resistance 114. The juncture of thyristor 112 and resistor 114 is connected through a resistor 116 to the emitter of transistor 96.

The collector of transistor 106 is applied through a diode 120 and a resistor 122 to circuit ground. The cathode of diode 120 is applied to the base of a transistor 124, the collector of which is applied through a resistor 126 to the juncture between resistors 26 and 30 via lead 128. The emitter of transistor 124 is connected through a diode 130 to the trigger electrode of a triac 134. A capacitor 131 is connected between terminal 18 and the anode of diode 130. A capacitor 136 and resistor 138 are connected across the triac 134. The triac 134 is connected in series with a relay winding 140 which controls the operation of normally closed relay contacts 142, 144 and 146 which are connected in the three phase lines 10, 12 and 14.

In operation of the device, when 24 volts A.C. is applied to the system at terminals 18 and 20, transistors 96 and 106 are both turned "off" and transistor 124 is turned "on". This allows gate current to flow in the triac 134, thereby turning it "on" and causing current flow through relay winding 140 to close the contacts 142, 144 and 146 to allow normal operation of the motor 16.

When the motor 16 is operating in the low speed mode, the power supply comprising diode 24, resistors 26 and 30, capacitor 28 and zener diode 32 provides a regulated 10 volts D.C. to the level sensing section of the circuitry. The level sensing section includes a current sensing portion which comprises the current transformers 34, 36 and 38, each of which sense the level of the current on one of leads 10, 12 and 14. The voltage dividers, comprising resistors 46–52 and rectifiers 64 and 76, each convert the current applied thereto into a proportional voltage level which is applied to the capacitor 74, thereby charging the capacitor 74 up to a level proportional to the current level and the load being protected. The voltage dividers are each supplied current which is proportional to the load current in the respective lead and the current ratio of the current transformer of the circuit.

The voltage level appearing across the capacitors 74 are applied through rectifiers 76, 78 and 80 to the summing point 82 for summing. The rectifiers 74–80 provide isolation to the current sensing sections from one another.

An important aspect of the present invention is that the values of resistors 46–52 are chosen to provide a predetermined voltage, which in the preferred embodiment is 4 volts RMS, acros the divider network when the trip, or overload, current is flowing in the load. In the low speed mode, the relay contacts 54, 56 and 58 are open and do not affect the operation of the circuitry. The capacitor 74 provides a time delay of voltage rise which is inversely proportional to the amount of the overcurrent.

The level sensing section also includes a voltage level sensing portion including transistors 96 and 106, rectifiers 110 and 120 and associated circuitry. The voltage level sensor compares the voltage appearing at the base of transistor 96 from the summing point 82 with a reference voltage provided by resistors 114, 116, 100 and 102 and thyristor 112. Variable resistor 100 may be varied to allow adjustment of the desired set point. The thyristor 112 provides temperature compensation of the set point.

When the voltage at the base of transistor 96 exceeds the reference voltage by one diode voltage drop, transistor 96 begins to conduct to cause base current and consequently collector current to flow in transistor 106. A portion of the transistor 106 collector current is fed back to the base of transistor 96 regeneratively through the feedback resistor 108, thereby causing a fast turn on of both transistors. The circuit thus "locks up" in the "on" condition, until the reset button 92 is depressed or until the power is interrupted long enough for capacitors 74 to bleed down below the "hold in" voltage.

The transistor 106 collector current flowing resistor 122 raises the voltage at the base of transistor 124 to the point where transistor 124 turns off. When transistor 124 turns off, the flow of gate current is terminated to the triac 134, thereby turning off triac 134 and terminating current flow through relay winding 140, thereby causing contacts 142, 144 and 146 to be opened to terminate current flow to the motor 16. Diode 110 makes the trip point of the system relatively insensitive to the value of the feedback transistor and diode 120 prevents emitter-base current of transistor 124 from turning transistor 96 "on".

When the motor 16 changes in operation mode from low speed to high speed, the sensor 62 detects the change and operates the relay 60 to close relay contacts 54, 56 and 58. This essentially shorts out each of the resistors 52 and changes the characteristics of the voltage divider networks 42 and 44. An important aspect of the invention is that the values of resistors 50 are chosen to provide four volts RMS across the network when the trip overload current is flowing in the load. Therefore, the operation of the voltage level sensing section of the circuit is identical regardless of whether or not the motor 16 is operating in the low or high speed modes. This eliminates the use of two separate voltage level detecting sections and thereby decreases the complexity and improves the reliability of the system.

While it will be understood that the component values of the present system may be varied in accordance with desired operating capabilities, the following component values have been found to work well in practice:

R26 - 2.2 ohms
R30 - 1.8 Kohms
R46 - 52- determined by motor load and current transformer ratio
R70 m 27 Kohms
R72 - 220 Kohms R84 - 220 ohms
R94 - 10 Kohms
R100 - 5 Kohms
R102 - 1 Kohms
R105 - 12 Kohms
R107 - 4.7 Kohms
R108 - 270 Kohms
R114 - 12 Kohms
R116 - 8.2 Kohms
R122 - 8.2 Kohms
R126 - 1.5 Kohms
R138 - 100 ohms
C28 - 220 $\mu f$
C74 - 100 $\mu f$
C88 - 1 $\mu f$
C98 - 10 $\mu f$
C109 - .1 $\mu f$
C131 - .1 $\mu f$
C136 - .1 $\mu f$
Q96 - 2N2222
Q106 - 2N3905
Q124 - 2N3905
Q134 - 2N2670A The present system thus provides an efficient and accurate system for continuously detecting overload conditions in multiphase multispeed motors. As previously noted, the present system may be utilized with slight modifications on multispeed motors having more than two operational speeds. The present system requires sensing only in the primary three phase lines applied to the motor and does not require any sensing of the secondary leads of the motor. While the present system works well in preventing overload on multispeed motors driving air conditioning systems, it will be apparent that the present system is applicable for use with any multispeed A.C. motor.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A system for protecting an alternating current phase multispeed motor for current above each of a plurality of predetermined current levels comprising:
   means for sensing the current level on said phase,
   circuitry connected in different configurations in response to different speeds of said motor for detecting the occurrence of a current level above each of said plurality of levels and for generating an electrical overload signal in response thereto, and
   a semiconductor switch responsive to said overload signal for terminating current flow through said phase upon detection of current level above any one of said plurality of levels, the time interval between detecting of the occurrence of a current level above said predetermined levels and the termination of current flow being inversely proportional to the magnitude of the sensed current level.

2. A system for protecting a multispeed motor in both low and high speed modes comprising:
   means for sensing the current on an input phase of said motor,
   divider circuitry operable during said low speed mode for converting the sensed current to a first voltage proportional to said sensed current,
   means operable during said high speed mode for varying said divider circuitry for converting the sensed current to a second proportional voltage,
   means responsive to both said first and second voltages for generating an electrical overload signal upon the occurrence of a voltage above a single predetermined magnitude, and
   means responsive to said electrical overload signal for terminating current flow to said input phase of said motor.

3. The system of claim 2 wherein said sensing means comprises a current transformer.

4. The system of claim 2 wherein said divider circuitry includes a resistor network for converting the sensed current to said first voltage and further including means for removing a portion of said resistor network during operation of the high speed mode of said motor.

5. The system of claim 4 and further comprising:
   relay contacts connected across a portion of said resistor network, said contacts open during said low speed mode and closed during said high speed mode.

6. The system of claim 5 wherein said relay contacts are automatically opened and closed in response to a motor speed sensor.

7. The system of claim 2 wherein said overload signal generating means comprises:
   means for generating a predetermined reference voltage, and
   means for generating said overload signal when either said first or second voltage exceeds said reference voltage.

8. The system of claim 7 and further comprising:
   a normally nonconductive transistor which is rendered conductive in order to generate said overload signal.

9. The system of claim 2 wherein said means for terminating current flow comprises:
   a triac device which is conductive during normal operation of said system and which is rendered nonconductive by the generation of said overload signal.

10. The system of claim 9 and further comprising:
    a relay responsive to nonconduction of said triac device for terminating said current flow.

11. The system of claim 10 and further comprising reset means for again rendering said triac device conductive.

12. A system for preventing current overload in a three phase multispeed motor in low and high speed modes comprising:
    means for sensing the current level in each of said phases,
    a divider network connected to each of said sensing means and having a first configuration for converting the sensed current in the low speed mode into a voltage and further having a second configuration for converting the sensed current in the high speed mode into a voltage,
    means responsive to said voltages for generating an electrical overload signal when said voltages exceed a predetermined magnitude, and
    means responsive to said electrical overload signal for controlling the current flow through the phases of said motor.

13. The system of claim 12 wherein said divider network includes a plurality of resistors, each of said resistors being connected in said first configuration and ones of said resistors being electrically removed from said network in said second configuration.

14. The system of claim 12 and further comprising a capacitor for storing the voltage appearing across each said divider network.

15. The system of claim 12 wherein said voltages from all of said divider networks are summed, and said overload signal being generated when said summed voltages exceed said predetermined magnitude.

16. The system of claim 12 wherein said means for controlling comprises:
   a normally conductive triac device which is rendered nonconductive in response to said overload signal.

17. The system of claim 16 and further comprising normally closed relays connected in series with each of said phases, said relays being opened in response to said triac device being rendered nonconductive.

18. The method of protecting a multiple phase multispeed motor from overcurrent comprising:
   sensing the current level on each of said motor phases,
   converting each of said sensed current levels to proportional voltages with a first resistive network in a first motor speed mode and with a second resistive network in a second motor speed mode, and
   generating an electrical overload signal when said proportional voltages exceed a predetermined voltage level.

19. The method of claim 18 and further comprising:
   terminating flow of current in said motor phases in response to said overload signal.

20. The method of claim 19 wherein said motor drives an air conditioning system and further comprising:
   means responsive to the ambient temperature adjacent said motor for changing the speed of said motor and for interconnecting one of said first or second resistive networks.

* * * * *